AUTOMATIC TELEPHONE DIALING APPARATUS

Original Filed May 1, 1957

INVENTOR.
JOSEPH J. ZIMMERMANN

United States Patent Office 3,132,212
Patented May 5, 1964

3,132,212
AUTOMATIC TELEPHONE DIALING APPARATUS
Joseph J. Zimmermann, Milwaukee, Wis., assignor, by mesne assignments, to Automatic Electric Laboratories, Inc., Northlake, Ill., a corporation of Delaware
Original application May 1, 1957, Ser. No. 656,281, now Patent No. 3,072,746, dated Jan. 8, 1963. Divided and this application Sept. 7, 1962, Ser. No. 222,084
5 Claims. (Cl. 179—90)

This invention relates to automatic dialing of telephones and in particular to an electrically operated device employing a previously recorded telephone number. This is a divisional application of applicant's prior copending application Serial No. 656,281, filed on May 1, 1957, now Patent No. 3,072,746, and entitled Automatic Telephone Dialing Apparatus.

The present trend in telephone dialing systems is toward telephone numbers employing more characteristics or digits to allow inclusion of more telephones within one system. The greater number of digits causes increased confusion and inconvenience in the dialing of a telephone number.

In times of emergency, even a relatively few characteristics in a telephone number is apt to result in confusion and misdialing of the necessary party.

In other instances, personnel is placed to periodically check apparatus which is located at some distance from a central station. The personnel calls the central station by telephone and reports malfunctioning of the apparatus. This method of fault detection is relatively costly and time consuming and is only as accurate and trustworthy as the personnel involved.

The present invention provides an automatic dialing means for push-button dialing and also for automatically dialing a distant telephone in response to a predetermined disturbance or happening. Apparatus of the present invention may be disposed adjacent operational apparatus disposed at a distance from a central office to automatically telephone the central office and give warning of malfunctioning of the operational apparatus.

In accordance with the present invention, the telephone number which is to be dialed and a message which is to be transmitted, if any, is successively set up on a suitable storage record. A reproducer is operatively associated with the record to translate the number coded on the storage record to suitable electrical signals, and is actuated in response to either a push-button or some local disturbance. Electrically operated apparatus is connected to these electrical signals and to the telephone line to load the telephone line and to simulate the manual dialing of a distant telephone.

The accompanying drawing illustrates the best mode presently contemplated by the inventor for carrying out the invention.

Figures 1, 2, 3, 4, 5:
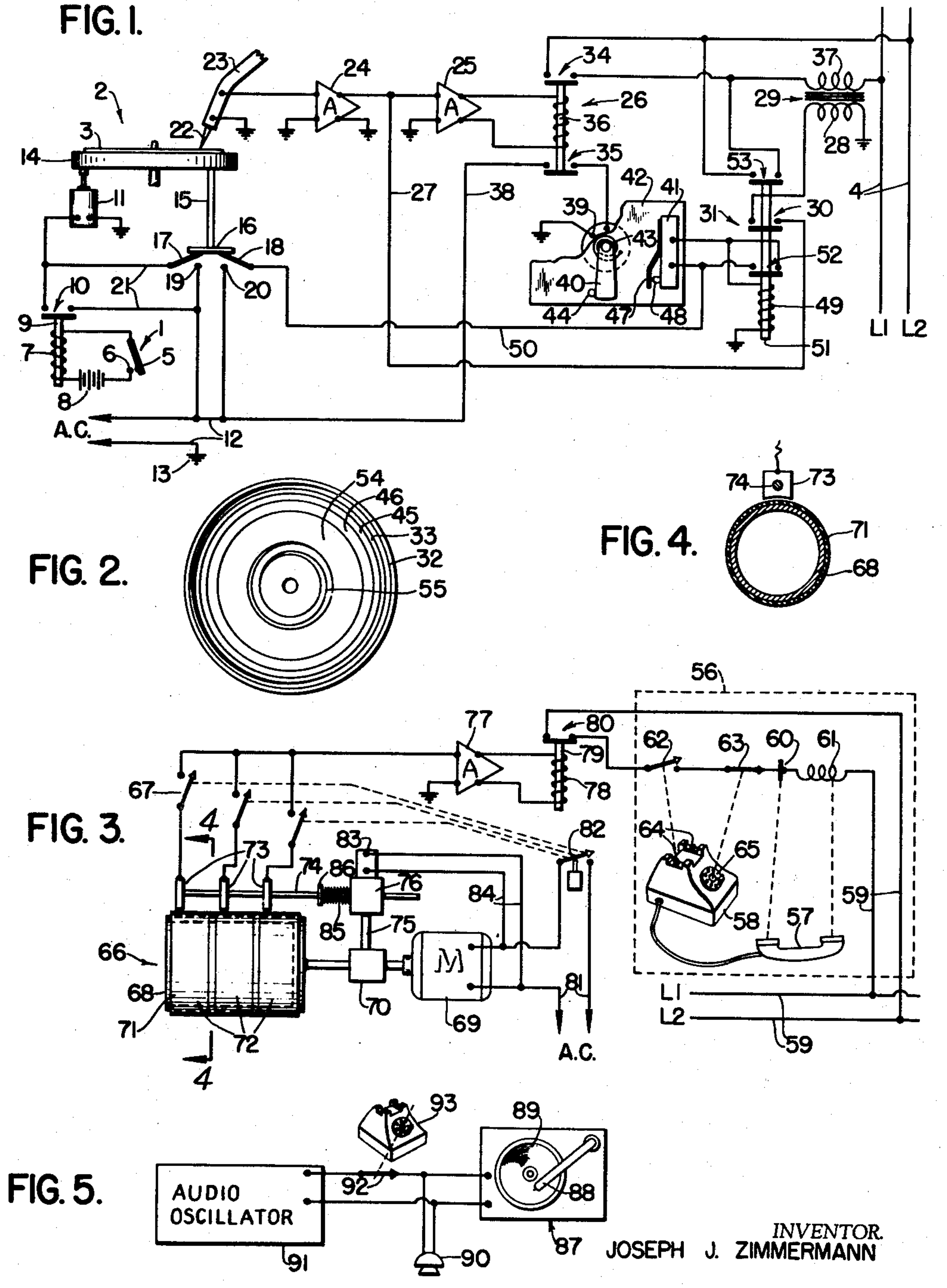
FIGURE 1 is a schematic circuit of a detection circuit employing the present invention.
FIG. 2 is an enlarged plan view of a disc type record for the reproducer of FIGURE 1.
FIG. 3 is a diagrammatic illustration of push-button apparatus for automatically dialing a telephone.
FIG. 4 is a view taken on line 4—4 of FIG. 3.
FIG. 5 is a diagrammatic illustration of apparatus for making automatic dialing records.

Referring to the drawing and particularly FIGURE 1, the first illustrated embodiment of the invention comprises generally a bimetallic detector 1 which is responsive to a local thermal condition to control a reproducer 2. The reproducer is adapted to pick up the signals established on a record 3 and operatively connect them to the telephone line 4 to dial a distant telephone station, not shown, and then transmit a message thereto.

The illustrated bimetallic detector 1 is of any suitable type and generally comprises a strip of two dissimilar metals 5 normally holding the set of contacts 6 in open position. In the event of a predetermined local thermal disturbance, the strip 5 deflects because of the unequal expansion rate of the two dissimilar metals and closes the contacts 6.

The contacts 6 are serially connected with a triggering relay winding 7 and a suitable power source shown as a battery 8. Therefore, when the contacts 6 close, the relay winding 7 is energized by current from the battery.

The relay winding 7 electromagnetically controls a movable armature 9 to make and break a set of normally open contacts 10. The contacts 10 are serially connected with a reproducer motor 11 in a power circuit across a set of alternating current power lines 12.

The one power line 12 is shown grounded at 13 and the various electrical apparatus hereinafter described in the present embodiment is shown with the one terminal grounded in each instance. This grounded terminal provides the return path to the power lines 12 from the apparatus.

The illustrated reproducer 2 includes a turntable 14 which is driven by the motor 11 through suitable coupling mechanism, not shown. The turntable mechanism, not shown, includes a vertically movable pin 15 such as shown in the U.S. Patent 2,394,539 to J. Erwood et al. The pin 15 is normally in a retracted upper position and upon predetermined operation of the reproducer 2 extends vertically downward and remains in that position until the reproducer is reset to its initial position. A switch actuator 16 is secured to the end of pin 15 and engages a first switch arm 17 and a second switch arm 18 when the pin is depressed. The switch arms 17 and 18 are normally disengaged from contacts 19 and 20, respectively, with the pin 15 in a retracted upper position.

The switch arm 17 and the associated contact 19 are connected by conductors 21 in parallel with the triggering contacts 10. After a predetermined period of reproducer energization, the switch arm 17 engages contact 19 and latches the reproducer motor 11 to the power lines 12. This action establishes a time delay which allows momentary electrical disturbances without placing the apparatus into a cycle of operation.

A phonograph pickup 22 is secured to the end of a tone arm 23 and engages a spiral track on the record 3 through the automatic turntable mechanism, not shown. The pickup 22 converts the signal established on the record to a corresponding electrical signal or output. The output of the pickup 22 is connected in series with a pair of serially connected amplifiers 24 and 25 to a dialing relay 26. The output of the pickup 22 after passing through amplifier 24 is also connected by a lead 27 to one winding 28 of a telephone line coupling transformer 29. A set of normally open contacts 30 of a latch relay 31 normally maintains line 27 open.

As shown in FIG. 2, the spiral track of record 3 begins at the outer edge with a spiral lead-in groove 32 which is traversed in a period generally corresponding to the time delay movement of pin 15. The lead-in groove 32 carries the pickup 22 into a continuous tone zone 33. The continuous tone signal is impressed upon relay 26 after suitable amplification by amplifiers 24 and 25. The normally open contacts 30 block the continuous tone signal from the telephone coupling transformer winding 28 and thus from the telephone lines 4.

The dialing relay 26 includes two sets of normally open contacts 34 and 35 respectively which are simultaneously controlled by a common armature 36. The contacts 34 are connected in series with a second winding 37 of transformer 29 across the telephone lines 4. The continuous tone section or zone 33 of the record 3 actuates relay 26 to close the contacts 34 and thereby loads the telephone lines 4 with the winding 37. This simulates the lifting of the handset in a conventional desk type telephone, not shown.

In the conventional telephone system, a direct current is connected across the telephone lines 4. Sound and/or signals are transmitted over the telephone lines by the modulating or periodic interrupting of a circulating direct current. Thus, in manual dialing a conventional multi-digit telephone number, a switch, not shown, is periodically opened. The switch is connected across the telephone line in a loading circuit and periodically interrupts the direct current established therein.

Further, each telephone number is one permutation of a series of characters or objects. The characters are established by dialing a mechanism having a plurality of stations or positions. Each station is normally assigned one digit of the ten digits 0 through 9 in the decimal number system. The positions corresponding to digits 2 through 8 are also progressively assigned three letters of the alphabet omitting the letter Q and the digit 0 is assigned the final letter Z. By successively dialing the stations corresponding to the series of characters in a telephone number, the dialing switch periodically interrupts the loaded telephone line to automatically dial a distant subscriber.

In the present invention, the dialing relay contacts 34 correspond to the manually operated dialing switch and the winding 37 is the loading winding as in a conventional telephone instrument. Consequently, suitable actuation of relay 26 simulates the actuation of a conventional dialing switch, as hereinafter described.

The continuous tone signal on the record also actuates relay 26 to close the second set of normally open contacts 35. The contacts 35 are connected in a power line 38 to a timer motor 39. The timer motor 39 is preferably of a synchronous variety. The motor 39 drives a spring-loaded lever 40 toward a switch 41 carried by a common support 42 for the motor and the switch. A coil spring 43 is secured at one end to the motor 39 and at the opposite end to the lever 40 and biases the lever 40 toward a stop 44. The switch 41 is spaced from the stop 44 such that a predetermined continuous motor operation is required before lever 40 engages the switch. Therefore relay 26 must be continuously energized for a corresponding period before switch 41 is actuated. This period is longer than that for the pickup 22 to traverse the continuous tone section 33 on the record 3.

The continuous tone zone 33 carries the pickup 22 into a dialing section 45 on the record 3. The dial section 45 comprises a series of sub-sections or zones, not shown, which are successively coded to successive characters or digits in a telephone number. The dialing sub-sections are alternately cut with a rapidly broken tone corresponding to a particular character and no tone to separate the signals of successive characters. The pickup 22 converts the dialing sub-sections to a series of closely time spaced, electrical pulses separated by relatively long periods of silence. The contacts 34 and 35 are closed by the electrical signal established by the presence of a tone and are opened in the presence of no tone and consequent loss of an electrical signal. The making and breaking of the contacts 34 and 35 is in accordance with the series of characters in the telephone number and therefore the dialing of a conventional telephone is automatically simulated.

Following the dialing section 45 on the record 3 is a latching portion or zone 46 which is a continuous tone longer than the first continuous tone zone 33. The signal from continuous tone of zone 46 continuously energizes relay 26 and thereby maintains a load on the telephone lines 4 by holding relay contacts 34 closed. The continuous tone signal also holds relay contacts 35 closed and the motor 39 continuously drives the lever 40 against the bias of spring 43. The continuous tone zone 46 is sufficiently long to allow the motor driven lever 40 to engage a switch arm 47 of switch 41. The switch arm 47 then engages a switch button 48 to close the switch 41 and complete the circuit to a winding 49 of the latch relay 31. The winding 49 is connected by a lead 50 in series with the switch arm 18 and contact 20 which are held closed by the pin 15 as long as the operation of the reproducer 2 continues. The latch relay 31 includes an armature 51 which simultaneously controls the previously noted contacts 30 and also two other sets of contacts 52 and 53, respectively. The contacts 52 are connected in parallel with switch 41 and therefore once the relay 31 is energized, contacts 52 latch the relay winding 49 to power lines 12. The contacts 53 are connected in parallel with the dialing relay contacts 34 and thus hold the load winding 37 across the telephone lines 4 independently of contacts 34. The contacts 30 of relay 31 connect the winding 28 of transformer 29 in a complete circuit with the phonograph pickup 22 and thus permit transmission of messages over the telephone lines 4 from the reproducer 2.

A message section 54 is established on the record immediately following the continuous tone section 46. This message section 54 is traversed by pickup 22 and the message is transmitted over the telephone lines 4 to the distant telephone station. This message may give any suitable information; for example the address or location of the instant detector and the type of disturbance such as an increase or decrease in thermal conditions.

The message portion 54 leads into a terminal groove 55 which carries the pickup 22 and the tone arm 23 rapidly to the center of the record 3. When this occurs, the reproducer 2 automatically resets itself to its initial position and pin 15 is retracted as set forth in the previously referred to patent to J. Erwood. The switch arm 17 then disengages contact 19 and opens the latch to the phonograph motor 11. Simultaneously, the switch arm 18 disengages contact 20 and opens the latch circuit to the latch relay 31 which opens the associated contacts 30, 52 and 53.

When contacts 30 open, the pickup 22 of reproducer 2 is operatively disconnected from the telephone lines 4. When contacts 53 open, the winding 37 is disconnected from the telephone lines 4 and the lines are unloaded in the same manner as replacing the handset in a conventional telephone, not shown. Finally, the opening of contacts 52 prevents reenergization of latch relay 31 until the timer switch 41 is again actuated by the continuous tone section 46 on the record 3. The apparatus is once again in standby condition.

If the thermal disturbance controlling detector 1 has corrected itself, the apparatus remains in a standby condition. However, if the disturbance has not corrected itself, the apparatus will recycle and again automatically dial and transmit the message section 54 to the distant telephone station.

Although not shown, if desired, apparatus can be provided for permitting the distant station to transmit a message to the detection apparatus. The message would be recorded and thus be available to give instructions to the person correcting or checking on the disturbance.

Referring to FIGS. 3 and 4, an embodiment of the invention for push-button dialing is shown. A conventional desk variety telephone 56 includes a handset 57 adapted to rest on a base 58. The telephone 56 is connected to the telephone lines 59 by a transmitting button 60 and a coupling coil 61 connected in series with a handset switch 62 and a dialing switch 63. The transmitting button 60 is disposed within one end of the handset 57 and converts voice signals into modulating signals. The illustrated coil 61 is normally a portion of an autotransformer type coupling coil, not shown in full, which amplifies both the outgoing and incoming voice currents.

The handset switch 62 is controlled by a pair of switch buttons 64 on the handset cradle portion of the telephone base 58. The handset 57 depresses the buttons 64 and holds switch 62 open when resting on the cradle portion. The normally open switch 62 closes when the handset 57 is removed from the base 58 of the telephone 56 and completes the circuit connecting winding 61 and button 60 across the telephone lines 59.

When the telephone subscriber manually dials the distant telephone, he actuates a perforated disc 65 in a predetermined manner and automatically actuates switch 63 to alternately break and make the series circuit including winding 61 and button 60 or any other similar loading circuit. This establishes a predetermined train of pulses by periodically stopping the normal flow of direct current in the telephone line circuit. The pulse train actuates suitable relays, not shown, at the central station to ring a distant telephone station.

Automatic dialing is accomplished in accordance with the embodiment of the present invention illustrated in FIGS. 3 and 4 as follows.

A reproducer 66 is operatively connected to the telephone lines 59 to automatically dial one of a series of predetermined telephone numbers in response to manual actuation of one of a plurality of switches 67 through any suitable means, such as a push-button, not shown.

The illustrated reproducer 66 comprises a drum 68 which is rotated by a motor 69 through a suitable speed reducing coupling 70. A tubular magnetic record 71 slips over the drum 68 and has a plurality of dialing sections 72, each of which magnetically carries a telephone number in a magnetic sound track. A plurality of magnetic heads 73 are supported on a common shaft 74. The shaft 74 is driven in a longitudinal direction by a shaft 75 which extends from the coupling 70. A disengageable clutch 76 connects shafts 74 and 75 to establish simultaneous axial movement of the shaft 74 with rotation of the drum 68. Each of the magnetic heads 73 is initially aligned with the beginning portion of a record dialing section 72 and progressively traverses the associated section 72 when motor 69 is energized. The switches 67 selectively connect one of the magnetic heads 73 to the input of an amplifier 77 which has its output connected to a relay winding 78 to control relay armature 79.

Armature 79 actuates a set of normally closed contacts 80. The relay contacts 80 are connected in series with the switches 62 and 63 and the transformer winding 61. As the magnetic heads 73 traverse the record 71, the magnetic head 73 which is connected in a complete circuit by a switch 67 establishes electrical impulses which are impressed upon the relay winding 78. In the presence of a tone signal on the associated record section 72, the winding 78 opens the relay contact 80. In the absence of a signal on the magnetic record section 72, the contacts 80 return to the normally closed position. The intermittent making and breaking of the contact 80 simulate the making and breaking of the dialing switch 63 by the manual operation of the disc.

The automatic dialing contacts 80 are maintained in a normally closed position so that the telephone may be employed in the normal manner with manual dialing.

If desired and permitted by the telephone company, suitable electrical operating connections can be directly made between an electromagnetic actuator and the switch 63 to substitute switch 63 for contacts 80. Consequently, the signal on the record sections 72 is in the reverse of the signal on the record shown in FIG. 2, that is, the periods of tone and silence are reversed.

The motor 69 for driving the drum 68 is connected to alternating current power lines 81 through a suitable time delay switch 82. The switch 82 is provided with the time delay in opening and is so timed that the motor 69 is energized for a period corresponding to the movement of the magnetic heads 73 past the associated dialing section 72. The switch 82 is coupled to switches 67 in any suitable manner such that switch 82 is closed when one of the push-button switches 67 is actuated. Therefore, the motor 69 only operates during a period of automatic dialing.

At the completion of an automatic dialing operation, the magnetic heads 73 are automatically returned to their initial position. A solenoid 83 is operatively associated with the coupling clutch 76 which connects the shafts 74 and 75 and is energized when the motor 69 is energized. To effect simultaneous operation of the solenoid 83 and motor 69, lines 84 connect the solenoid 83 in parallel to motor 69 and in series with the normally open time delay switch 82. Therefore, clutch 76 is held in only during the dialing operation. A coil spring 85 encircles shaft 74 and engages a collar 86 and coupling clutch 76. The spring 85 is compressed as the shaft 74 moves under the action of clutch 76. When the clutch is de-energized, the spring 85 expands and returns the shaft 74 to its original position.

The operation of the automatic dialing system of FIGS. 3 and 4 is described as follows.

The subscriber picks up the handset 57, thereby releasing switch buttons 64 and closing the switch 62. This loads the telephone lines 59. Subscriber then actuates one of the switches 67 which carries the desired telephone number and simultaneously closes the time delay switch 82. The motor 69 and solenoid 83 are simultaneously energized. The drum 68 is rotated by motor 69 and the magnetic heads 73 are driven axially of the tubular magnetic record 71. The magnetic head 73 converts the recorded telephone number into corresponding electrical pulses. The electrical impulses after suitable amplification by amplifier 77 are impressed on the relay winding 78 which actuates its contact 80 to simulate the manual dialing of the telephone 56. When the magnetic head 73 reaches the end of an associated dial section 72, the time delay switch 82 opens. The associated switch 67 is also opened. The energization circuit to the solenoid 83 and motor 69 is broken and the spring 85 then returns the shaft 74 and the associated magnetic heads 73 to their initial standby position.

Although the illustrated embodiment of FIGS. 4 and 5 employs a plurality of magnetic heads 73, a single magnetic head may be used and manually or automatically positioned adjacent the desired dialing section in any suitable manner.

Further, the complete dialing operation may be accomplished with a single revolution of a suitable record such that the pickup or sensing device automatically terminates to a standby position. No separate reset mechanism would then be necessary.

The automatic dialing device may also be interlocked with the handset switch or the like such that if the operating subscriber replaces the handset or otherwise opens the handset switches prior to completion of a dialing cycle, the dialing device immediately returns to standby.

Referring to FIG. 5, a system for recording telephone numbers upon a suitable record is shown. A suitable recording device 87 includes a cutting stylus 88 to cut a disc record 89. A conventional microphone 90 and an audio oscillator 91 are connected in parallel to the input of the recording device 87. In series with the audio oscillator 91 is a telephone dialing switch 92 which is operated by a conventional telephone dial 93. To cut the record 89, the recording device is started through a suitable operating circuit, not shown. The oscillator 91 is energized after the stylus 88 traverses a lead-in or starting groove to record a continuous tone upon the record 89. At the end of the continuous tone zone, the desired telephone number is dialed by manual operation of the telephone dial 93 which by actuation of switch 92 interrupts the output of the oscillator 91 and establishes a series of tone pulses on the record 89 which are automatically coded to the telephone number which is dialed. Subsequently, the latching tone signal is applied to the record 89 from the audio oscillator 91. The audio oscillator 91 is then disconnected and a message placed on the record 89 by speaking into the microphone 90 to complete the record 89.

Although the dialing system as described employs successively established pulses or signals, they may be simultaneously established and successively delayed through any suitable electrical apparatus to give the necessary progressive actuation to a dialing switch. Further, if dialing signals other than a train of pulses are employed in the telephone system, the output record is changed accordingly. For example, if a series of different frequency signals were used for dialing, the record can carry the required frequency signals and transmit them over the telephone lines.

The apparatus in an automatic alarm system and the like can be made to automatically recycle such that it will continue to operate until the called telephone has been answered and the defect corrected.

Other types of control records may be employed within the scope of the present invention and may be automatically formed by suitable modification of the disclosed record forming process. For example, punch tape or printed surfaces may be used to store coded marks and suitable sensing devices used to convert the marks to electrical signals which then actuate a relay means to effect the automatic dialing.

Further, when employing a sound record, the respective loading and latching portions may be established to employ other than a time differential to effect their respective functions. For example, a different frequency signal may be recorded on the loading portion and on the subsequent latching portion of the record. Frequency responsive relay coils or the like are connected in the circuit to effect the loading and latching functions.

Although a relay is shown to make and break the load across the telephone line, any other suitable direct acting electrical switch means may be substituted therefor. For example, a transistor or the like may be connected in the loading circuit and sequentially biased to conduct by the signal from the storage medium carrying the coded signals.

The present invention provides a simple and reliable apparatus for automatically and electronically dialing of telephones in a telephone system employing in particular a multi-character designation for each subscriber.

Various modes of carrying out the invention are contemplated as being within the scope of the following claims particularly pointing out and distinctly claiming the subject matter which is regarded as the invention.

I claim:

1. A telephone unit for connection to a set of telephone lines and for selective manual dialing of the several characters of multiple character telephone numbers and for automatic dialing of predetermined telephone numbers, which comprises a magnetic record means having groups of spatially distributed magnetized areas with each group corresponding to said characters of one of said predetermined telephone numbers, individual magnetic pickup members each movably mounted to traverse a different one of said groups, a dialing relay having a set of normally closed contacts, separate manually operable switches individually connecting each of said pickup members to said dialing relay, means for moving said pickup members to traverse the corresponding group and actuating said dialing relay, and a telephone for connection to said telephone lines and having a dialing circuit serially including said normally closed contacts and a normally closed dialing switch and a handset switch and having a handset for selectively opening said handset switch when the telephone is not in use and for closing said handset switch when the telephone is in use, said normally closed contacts being actuated to reproduce a number of pulses being a coded electrical representation of a telephone number in response to actuation of any one of said switches.

2. The telephone unit system of claim 1 wherein said magnetic record member is a drum having said groups of spatially distributed magnetized areas arranged in axially spaced dialing zones and each group is formed as a spiral path and wherein said means for moving said pickup members includes a common shaft supporting said pickup members adjacent corresponding dialing groups, spring means urging said shaft to locate the pickup members in alignment with a starting end of each group, a drive motor connected to rotate said drum, an electrically operated clutch connected to said shaft and to said motor to axially move the shaft in timed relation to the rotation of the drum and thereby moving the pickup members for actuating the dialing relay, and time delay switch means coupled to said manually operable switches and connected in circuit with said motor and said clutch to cyclically operate the motor and clutch.

3. Apparatus for push-button dialing of a telephone station in a telephone line system employing different combinations of a predetermined plurality of characters to designate various subscriber telephones and having manually actuated means successively actuated to establish successive trains of electrical pulses in the telephone line system in accordance with successive characters in a telephone number, which comprises a storage medium having a plurality of storage zones to retain coded intelligence in the form of sensible marks, each of said zones being adapted to receive spaced groups of sensible marks in closely spaced relation and defining subzones in each zone equal in number to the number of characters in a telephone number, each subzone including groups of sensible marks corresponding to the trains of electrical pulses for one of said telephone number characteristics, individual sensing means each for traversing one of said storage zones and generating a train of electrical signals corresponding to said marks of the corresponding zone, means connecting the sensing means to the telephone line, means to move said sensing means to traverse the corresponding storage zone, a plurality of push-button switches operatively associated one with each individual sensing means and each serving to operatively connect the corresponding sensing means and said telephone line system to selectively transmit successive trains of electrical pulses in accordance with the sensible marks and thereby simulate the actuation of said manually actuated means, time delay means actuated in response to actuation of any push-button switch to start a timing cycle having a period corresponding to the period during which the sensing means traverses one of said storage zones, and means connecting said time delay means to said sensing means to disconnect said sensing means from said telephone line system at the end of the timing cycle.

4. A telephone dialing system for automatic and individual dialing of predetermined different telephone numbers, comprising a dialing circuit including an electroresponsive dialing switch, a magnetic record drum having said predetermined telephone numbers magnetically recorded thereon in separate axially distributed zones with the individual characters of each number distributed axially of the drum, a plurality of magnetic pickup means mounted one adjacent each zone and movable of the drum for scanning of said individual characters in the corresponding zone for establishing a series of time-spaced electrical signals corresponding to the characters of said predetermined telephone numbers and connected to actuate said electroresponsive dialing switch, drive means for cyclically moving said pickup means through said dialing movement, and a resiliently loaded return mechanism coupled to said pickup means and stressed by the dialing movement of said pickup means and operative in response to disenabling of said drive means to return said pickup means to the starting position.

5. The telephone dialing system of claim 4 having an electromagnetic clutch means releasably coupling said drive means to said pickup means whereby said drive means is disenabled by release of said clutch means.

References Cited in the file of this patent

UNITED STATES PATENTS

| | | |
|---|---|---|
| 2,348,758 | Samburg et al. | May 16, 1944 |
| 2,827,515 | Zuber | Mar. 18, 1958 |
| 2,891,114 | Villmann et al. | June 16, 1959 |
| 2,953,647 | Johanson | Sept. 20, 1960 |
| 3,074,059 | Flavan | Jan. 15, 1963 |